Jan. 2, 1945.  D. D. KALLENBACH  2,366,266

OSCILLATOR

Filed Jan. 11, 1944  3 Sheets-Sheet 1

Inventor
Donald D. Kallenbach

By Clarence A. O'Brien
and Harvey B. Jacobson
Attorneys

Jan. 2. 1945. D. D. KALLENBACH 2,366,266
OSCILLATOR
Filed Jan. 11, 1944  3 Sheets-Sheet 2

Inventor
Donald D. Kallenbach

By Clarence A. O'Brien
and Harvey B. Jacobson
Attorneys

Jan. 2. 1945.   D. D. KALLENBACH   2,366,266
OSCILLATOR
Filed Jan. 11, 1944   3 Sheets-Sheet 3

Inventor
Donald D. Kallenbach

By Clarence A. O'Brien
and Harvey B. Jacobson
Attorneys

Patented Jan. 2, 1945

2,366,266

UNITED STATES PATENT OFFICE 2,366,266

OSCILLATOR

Donald D. Kallenbach, Cheyenne, Wyo., assignor to Ideal Laboratory Tool & Supply Co., Cheyenne, Wyo., a partnership composed of R. M. Tinus and Donald D. Kallenbach Application January 11, 1944, Serial No. 517,843

4 Claims. (Cl. 73—1)

This invention relates to improvements in oscillators or mechanism for converting rotary motion into reciprocating motion parallel to an axis of rotation.

While the invention has been primarily designed as a bench machine for subjecting gyroscopic aircraft instruments to a simulated aircraft motion and enable a mechanic to properly balance, adjust and calibrate said instruments, it is to be understood that the invention is capable of other practical applications, such as use in the construction of variable displacement pumps, multi-contact flashing switches, and the like.

The primary object of the present invention is to provide a mechanism of the above kind embodying a trunnion block adjustment which provides a center of gyration well above a table forming part of the mechanism and upon which the instruments are to be placed, thereby avoiding lateral acceleration to the instruments on test. In other words, a center of gyration is provided which approaches the center of gravity of the instrument being tested, in which case the lateral accelerations are negligible. This makes it possible to balance and adjust the instruments in order that they will not drift excessively when in flight service.

Other important objects of the invention are to provide a mechanism or machine of the above kind which is of exceptional compactness and low overall height so as to make it ideal for bench use, which is very rugged to insure long and trouble-free service, and which is comparatively easy to adjust.

The present invention consists in the novel form, combination and arrangement of parts hereinafter more fully described, shown in the accompanying drawings and claimed.

In the drawings, wherein like reference characters indicate corresponding parts throughout the several views.

Figure 1:
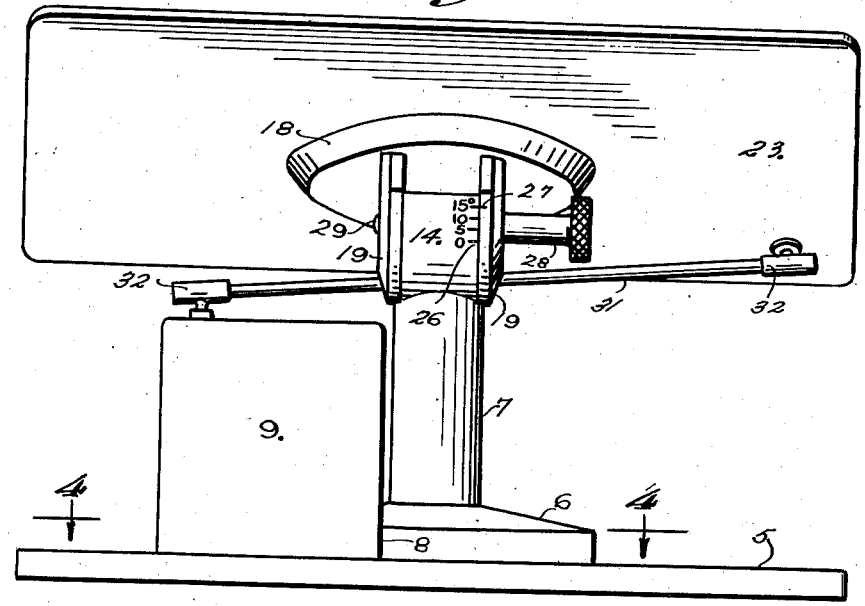
Figure 1 is a front elevational view of an oscillator constructed in accordance with the present invention.
Figure 4:
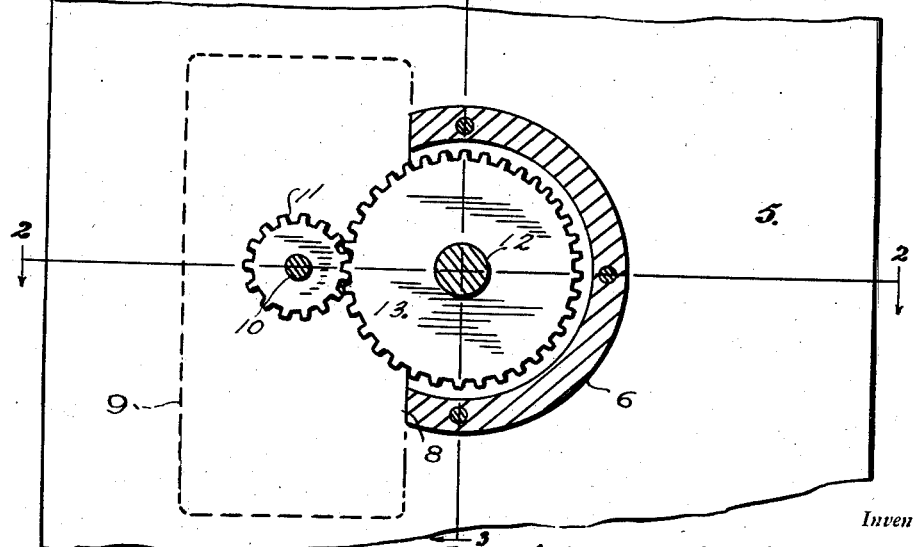
Figure 4 is a horizontal section taken on line 4—4 of Figure 1.
Figure 2:
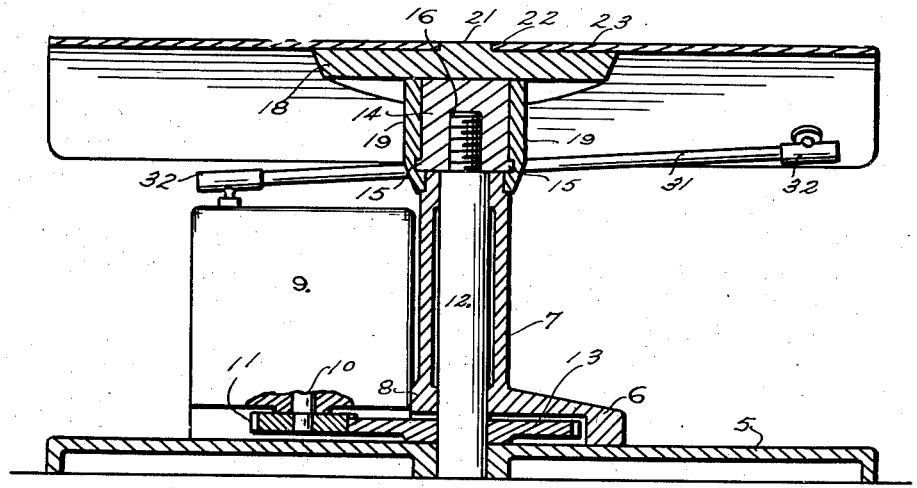
Figure 2 is a substantially central vertical sectional view thereof taken on the plane of line 2—2 of Figure 4.
Figure 3:
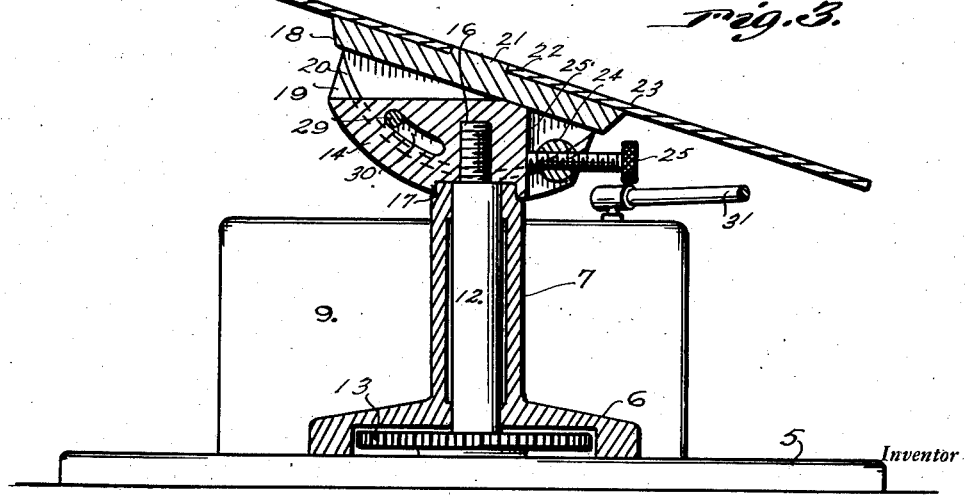
Figure 3 is a similar view taken on the plane of the line 3—3 of Figure 4.
Figure 5:
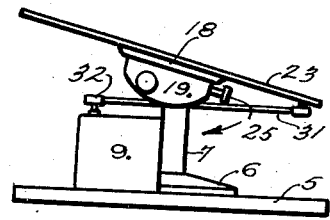
Figure 6:
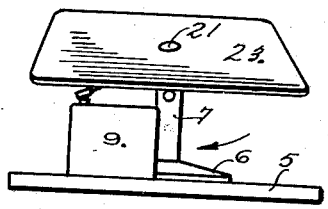
Figure 7:
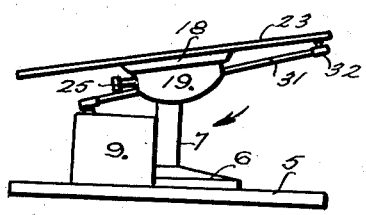
Figure 8:
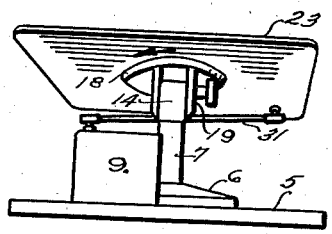
Figure 9:
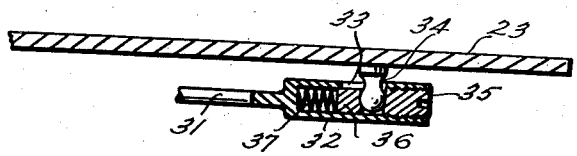

Figures 5 to 8, inclusive, are small diagrammatic elevational views showing various positions of the table as the trunnion head rotates in clockwise direction, and Figure 9 is a fragmentary sectional view illustrating the universal connection between the drag link and the table.

Referring in detail to the drawings, wherein I have shown by way of example a machine embodying the present invention and particularly designed for use to aid in the calibration of gyroscopic aircraft instruments, 5 indicates a stationary base having a hollow raised portion 6, from which rises a tubular standard 7 and one side of which is cut away, as at 8. Secured upon the base 5 at the cut-away side of raised portion 6 and close beside the standard 7 is a motor 9 having a depending drive shaft 10 on the lower end of which is secured a pinion 11. Journaled in the base 5 and standard 7 is a vertical stout shaft 12 on which is fixed a large gear 13 positioned in the hollow raised portion 6 and meshing with the pinion 11. Fixed on the projecting upper end of shaft 12 is a segmental trunnion block 14 provided on opposite sides with downwardly curved arcuate ribs 15 having a radius whose center is well above the block 14 and the parts carried thereby. The shaft 12 may have a reduced threaded upper end tightly screwed into the trunnion block 14, as shown at 16. Also, the trunnion block 14 preferably rotatably fits over the reduced upper end of standard 7, as at 17.

The present device further includes a trunnion head composed of a plate 18 from which depend rigid trunnion plates 19 that are spaced apart to snugly receive and flatly engage opposite flat sides of trunnion block 14, the plates 19 having arcuate grooves in the inner faces thereof, as at 20, corresponding to and slidably receiving the ribs 15 of trunnion block 14. Trunnion head plate 18 has a central upstanding short trunnion 21 rotatably fitted in a central opening 22 of table top 23.

It will be seen that the trunnion head is mounted on the trunnion block for tilting adjustment relative thereto about a horizontal axis located well above the table top 23. Means are provided for tiltably adjusting and securing the tilted adjustment of the trunnion head relative to the trunnion block, the adjusting means embodying a cross member 24 connecting the trunnion plates 19 behind the block 14 where the latter has a flat vertical face 25', and a set screw 25 threaded through the cross member 24 and bearing against the face 25' of block 14. When the screw 25 is fully retracted, the trunnion head may be fully tilted, and this tilt may be lessened by threading the screw inwardly. Suitable graduations 26 are provided on the rounded face of trunnion block 14 cooperating with an indicating line 27 on the edge of an adjacent trunnion head plate 19 for showing the angle of adjustment of the trunnion head relative to the trunnion block. The tilted adjustment of the trunnion head may be secured by means of a transverse screw 28 whose stem has a large inner end portion bearing against the adjacent trunnion plate 19 and a reduced end portion 29 passing through an arcuate slot 30 in trunnion block 14 and threaded into the opposite trunnion head plate 19. By tightening screw 28, the plates 19 may be brought into tight frictional engagement with opposite sides of trunnion block 14 for the purpose mentioned. The arcuate slot 30 is of course concentric with grooves 20, and the portion 29 of the securing screw is movable in this slot with the trunnion head.

A drag link 31 connects the table 23 with a stationary part such as the top of motor 9, for restraining said table against rotation with the trunnion head. As shown clearly in Figure 9, there is a universal connection 32 between each end of drag link 31 and the parts 9 or 23 to which it is attached. As these universal connections are similar, description and illustration of one will suffice for both. Each connection includes a hollow member rigid with the end of link 31 and having a slot in the top side thereof, as at 33, to permit the passage of a ball member 34 rigid with and projecting from the associated member 9 or 23. The ball member 34 is engaged at one side by means if the socketed inner end of a screw plug 35 threaded into the outer end of tubular or hollow member 32, and the opposite side of ball member 34 is engaged by a spring-pressed block 36 slidably arranged in hollow member 32 and urged toward the ball member by a spring 37. The side of block 36 which engages ball member 34 has a shallow socket to fit the side of ball member 34. It will thus be seen that an efficient universal connection is provided.

In operation, the motor 9 rotates the shaft 12 through the gearing 11, 13, and trunnion block 14 and trunnion head plate 18 with its attached parts are caused to rotate with shaft 12, trunnion 21 turning freely in opening 22 of table 23, which is restrained from rotation by drag link 31. When the top plate or table 23 is set to zero position, its plane is perpendicular to the axis of rotation, and there is no motion of the table as the head plate 18 revolves. To set the machine for operation, the plane of plate member 18 is placed at a desired angle to the axis of rotation through the trunnion block adjustment by adjusting the screw 25, and when the head revolves this angle is imposed on the table 23 at all points during each revolution of the head. Since the table is held against turning with the head plate by the drag link, the latter induces tilting of the table as the corner of the latter to which the drag link is attached, rises and falls. Thus, any instrument resting on table 23 is subjected to a wobbling motion without subjecting the implement to undesirable lateral accelerations that would change its drift characteristics and interfere with adjustment of the instrument.

From the foregoing description, it will be seen that the table will wobble and assume various positions as the head rotates in a clockwise direction, as shown in Figures 5 to 8, inclusive. The invention provides for efficiently carrying out the stated objects of the invention, but minor changes in details are contemplated such as fairly fall within the spirit and scope of the invention as claimed.

What I claim as new is:

1. An oscillator comprising a wobbling member, a rotary shaft, a block carried by said shaft in axial alignment therewith and turning with the shaft, a trunnion head member carried by said block and carrying said wobbling member and rotatable relative to the latter, means mounting the trunnion head member on the trunnion block for tilting adjustment diametrically of the shaft to a position at a desired angle to the axis of rotation of the shaft and the block and about an axis removed from the side of the wobbling member opposite that at which the trunnion head member is disposed, means to tiltably adjust said trunnion head member and secure the same in an adjusted position, means for rotatably driving said shaft, and means for restraining said wobbling member against rotation and permitting wobbling thereof.

2. An oscillator comprising a wobbling member, a rotary shaft, a block carried by said shaft coaxially therewith and turning with the shaft, a trunnion head member carrying said wobbling member and rotatable relative to the latter, means mounting the trunnion head member on the trunnion block for tilting adjustment diametrically of the block and the shaft to a position at a desired angle to the axis of rotation of said trunnion block and about an axis removed from the side of the wobbling member opposite that at which the trunnion head member is disposed, means carried by the head member to tiltably adjust said trunnion head member and hold the same in an adjusted position, means for rotatably driving said shaft and said trunnion block, and means for restraining said wobbling member against rotation and permitting wobbling thereof, said restraining means comprising a drag link having universal joint connections at its ends for connecting one end of said drag link with a stationary member and the other end of the drag link with the wobbling member.

3. An oscillating table comprising a base having a tubular standard rising therefrom, a motor mounted on the base beside the standard, a vertical shaft journaled vertically through said standard and operatively geared to said motor, a trunnion block fixed on the upper end of said shaft in axial alignment therewith and turning with the shaft, a trunnion head member mounted on the trunnion block for tilting adjustment diametrically of the shaft and relative to the block to an adjusted position at a desired angle relative to the axis of rotation of said shaft and about an axis situated well above the trunnion head member, a table top resting on said trunnion head member, said trunnion head member having a trunnion rotatable through an opening formed in the table top, means restraining said table top against rotation with the head member while permitting wobbling thereof, and means to tiltably adjust the trunnion head member relative to the trunnion block and holding the same in an adjusted position.

4. An oscillating table comprising a base having a raised hollow portion cut away at one side, an upwardly extending hollow standard carried by the said hollow portion, a vertical shaft journaled through said standard, a gear fixed on the lower portion of said shaft within the hollow raised portion of the base, a motor mounted on the base close to one side of the hollow standard, said motor having a depending drive shaft carrying a pinion meshing with said gear, a trunnion block carried by the upper end of said shaft in axial alignment therewith, a trunnion head member mounted on said trunnion block for tilting adjustment diametrically of the shaft to positions at a desired angle relative to the axis of said shaft and about an axis well above said trunnion head member, said head having side plates engaging opposite side faces of the block and formed with arcuate slots, a screw carried by said block and passing through the slots to guide and limit tilting of the head, means carried by the side plates to engage the block and to tiltably adjust said trunnion head member, a table top resting on said trunnion head member, said trunnion head member being rotatable relative to the table top, and means to restrain the table top against rotation with the head member while permitting wobbling thereof.

DONALD D. KALLENBACH.